United States Patent [19]

Schiel

[11] Patent Number: 5,123,150
[45] Date of Patent: Jun. 23, 1992

[54] PRESS ROLL WITH CONTROLLABLE DEFLECTION FOR TREATMENT OF WEB TYPE MATERIAL

[75] Inventor: Christian Schiel, Heidenheim, Fed. Rep. of Germany

[73] Assignee: J.M. Voith GmbH, Heidenheim, Fed. Rep. of Germany

[21] Appl. No.: 640,521

[22] Filed: Jan. 11, 1991

Related U.S. Application Data

[63] Continuation of Ser. No. 434,928, Nov. 13, 1989, abandoned.

[30] Foreign Application Priority Data

Nov. 17, 1988 [DE] Fed. Rep. of Germany ....... 3838852

[51] Int. Cl.⁵ ............................................. B30B 13/00
[52] U.S. Cl. .................................... 29/116.2; 29/116.1
[58] Field of Search ........................... 29/116.1, 116.2; 162/206, 358

[56] References Cited

U.S. PATENT DOCUMENTS

| | | | |
|---|---|---|---|
| 4,293,988 | 10/1981 | Biondetti | 29/116.2 |
| 4,414,890 | 11/1983 | Schiel et al. | 100/162 B |
| 4,459,726 | 7/1984 | O'Brien et al. | 29/116.2 |
| 4,506,421 | 3/1985 | Appenzeller et al. | 29/116 AD |
| 4,520,723 | 6/1985 | Pav et al. | 29/116.2 X |
| 4,639,990 | 3/1987 | Schiel et al. | 29/116.1 |
| 4,683,628 | 8/1987 | Schönemann | 29/116.1 |
| 4,729,153 | 3/1988 | Pav et al. | 29/116.2 |
| 4,757,582 | 7/1988 | Verkasalo | 29/116.2 |
| 4,757,583 | 7/1988 | Pav et al. | 29/116.1 |
| 4,757,584 | 7/1988 | Pav et al. | 29/116.1 |
| 4,757,585 | 7/1988 | Niskanen | 29/116.2 |
| 4,856,157 | 8/1989 | Klisters | 29/116.2 |
| 4,962,577 | 10/1990 | Kubik et al. | 29/116.1 |

FOREIGN PATENT DOCUMENTS 2068505A 8/1981 United Kingdom .
2098304A 11/1982 United Kingdom .

Primary Examiner—Mark Rosenbaum
Assistant Examiner—Frances Chin
Attorney, Agent, or Firm—Baker & Daniels

[57] ABSTRACT

A press roll with controllable deflection, for treatment of web type material, specifically for the treatment of a paper web (2), with a roll shell (1) that is rotatably connected with an axle (10) serving as flexural backing and defining with it an annular intermediate space. Within this intermediate space, in the area of the roll ends, there is a seal (transverse seal 18) each provided, and at that, in such a way that between the end of the roll shell (1) and the transverse seal (18) there remains on both sides of the web-shaped material (2) a free marginal zone (R). There is provided on each roll end, in the area of the marginal zone (R) on the inside of the roll shell (1), a channel type cavity (6) that can be charged with a heat transfer fluid. This makes it possible to directly and specifically influence thermally the diameter of the roll, on both ends of the roll in the area of the marginal zones, so that diameter differences between the marginal areas of the roll and the center area can be compensated for in the operation of the press roll.

22 Claims, 3 Drawing Sheets

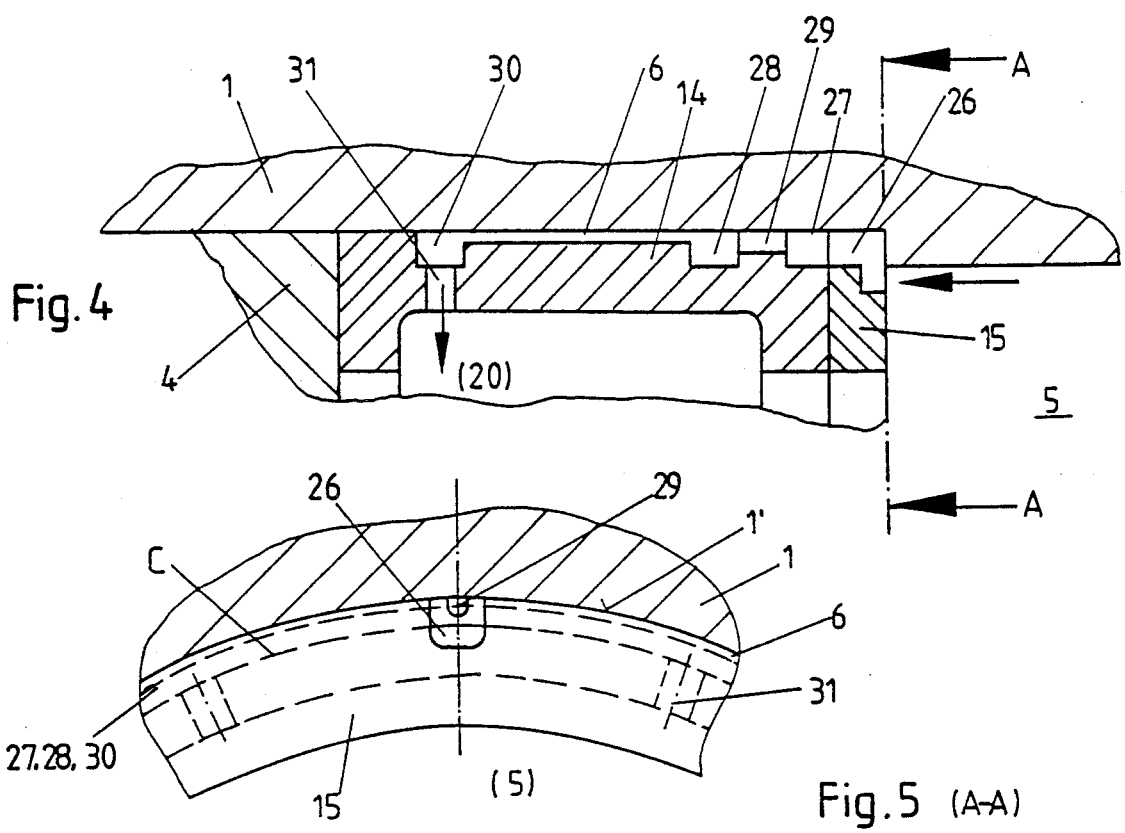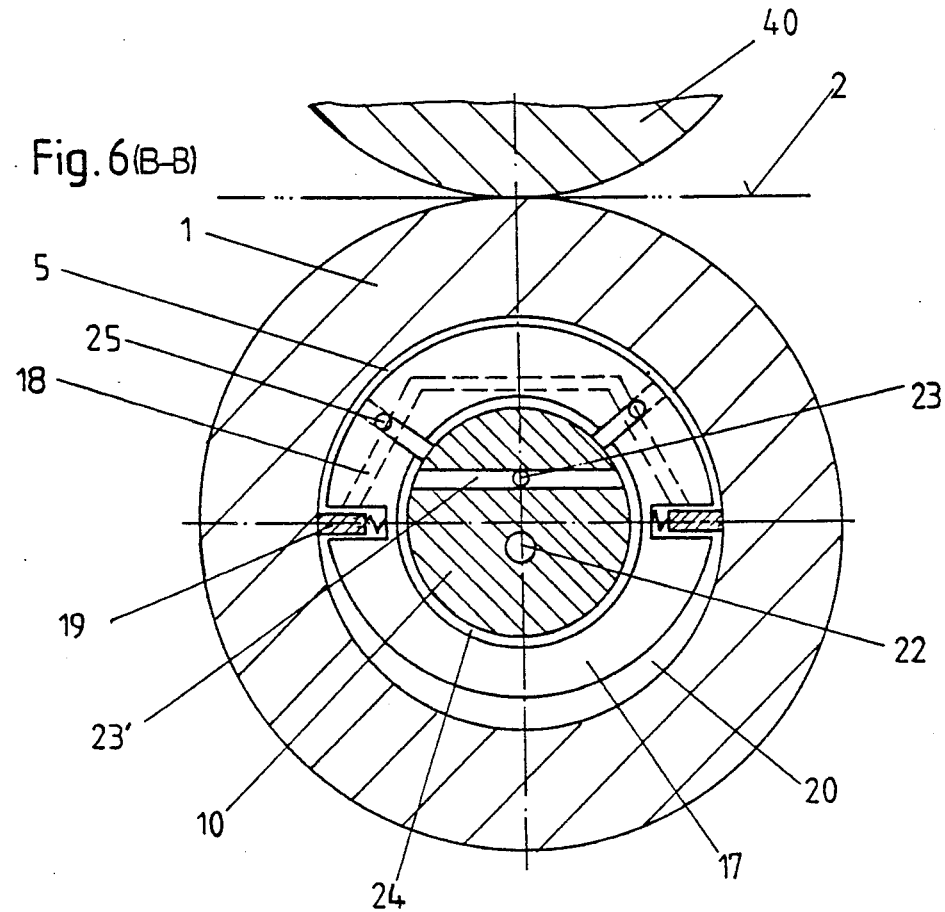

PRESS ROLL WITH CONTROLLABLE DEFLECTION FOR TREATMENT OF WEB TYPE MATERIAL

This is a continuation of application Ser. No. 07/434,928, filed Nov. 13, 1989, now abandoned.

BACKGROUND OF THE INVENTION

The present invention concerns a press roll with controllable deflection for treatment of web type material, specifically for the treatment of a paper web in a press or a calender, where a roll shell is provided which rotatably is connected with a fixed axle that extends through the roll shell and serves as a flexural backing and defines together with said axle a ring-shaped intermediate space. Within the intermediate space a pressure chamber is defined which at least approximately corresponds to the web width of the material, and which is charged with a pressure fluid. The pressure chamber is defined in part by transverse seals in the area of the roll ends, each of which is spaced from the end of the roll shell and extends at least across part of the circumference of the axle leaving between the end of the roll shell and the transverse seal a free marginal zone on both sides of the web-shaped material.

Press rolls of this type are known and, in interaction with backing rolls, serve to treat in a specific way the generally endless web type material that passes between them. In conjunction with paper machines, press rolls of this type are used, e.g., in the wet press or in the calendering sections of press stations. As the width of the paper machines increases, the problem of maintaining a constant line force across the entire width of the paper web assumes decisive importance, and this problem is basically solvable only with a roll whose deflection can be controlled. In the case of such rolls, backing forces which are active in the pressing plane are generated between the rotating shell and the fixed axle. The backing forces between the shell and the axle are generated by one or several hydraulic pressure chambers or pressure elements that are arranged between the shell and the axle. Thus, viewed across the width of the paper machine, the press roll can be adjusted at any time in its entirety or also zonewise to compensate for deflections of the backing roll, making it possible to meet the requirement of a constant line force across the width of the web.

This requirement, however, must be met not only in the center area of the web width, but, ideally, it must be met up to the edge of the material web. This applies especially to calender sections consisting of two or more rolls that are forced on one another and between which passes the paper web that is to be calendered. Naturally, the rolls must accurately fit on one another up to the paper web edge in order for the paper web to leave the calender section with an exactly identical thickness as viewed across the entire width of the calender section.

Insufficiencies still occur in known roll arrangements for the following reasons: On the one hand, if one of the rolls of the calender is heated, i.e., if the temperature of the roll is higher than that of the paper, a heat flow occurs from the roll to the paper. This results in a reduction in diameter of the roll which is non-uniform, as viewed across the entire width of the calender, because the roll edges give off less heat in the area that extends beyond the paper web. The marginal areas of the roll thus have a larger diameter than the area swept by the paper web, and the result is that the edges of the paper web will be squeezed together. Hence, the paper web leaving the calender possesses edge sections that are thinner. On the other hand, if the temperature of the roll is lower than that of the paper, a reciprocal effect occurs. The center area of the roll absorbs heat from the hotter paper, but the marginal area do not. These rather give off heat to the environment, with the ultimate result that the marginal areas remain smaller in diameter than the center area of the roll, which expands due to heat absorption. As a consequence, the paper web leaving the calender is heavier on the edges than it is in the center area.

Balancing the temperatures of the roll and of the paper web is very complex, all the more so as this balancing is subject to environmental effects and strong external effects resulting from interruptions of production. The fit between the roll in the area of its ends, that is, in the area of the paper web edges, also depends ultimately on other factors in addition to the temperature of the paper web and the temperature of the heating fluid in the rolls. The machine speed, moisture of the paper web, tension of the paper web and the wrap angle between rolls and paper web also play a considerable role. A change of the width of the paper web being produced relative to the width for which the calender was conceived also has a considerable influence. Additionally, it must be taken into account that the marginal areas of the rolls are subject to increased wear, particularly in the case where the temperature of the roll is lower than that of the paper web, with the result that over the service life of a set of rolls paper webs will be produced with edges that become increasingly thicker.

These drawbacks can partly be influenced o minimized with expensive and more complex auxiliary devices, such as blowing nozzles, induction coils, etc., for specifically affecting the temperature distribution along the rolls. With the measures proposed so far, however, it has not been possible in all cases to achieve an equalization of the diameter across the entire width of the rolls in such a way that variations in the marginal areas will practically be eliminated and the thickness of the paper produced will be exactly equal across the entire width of the web.

Previously known from the German patent document 31 28 722 (FIG. 9) is a roll with controllable deflection where the temperature distribution is influenced across the width of the roll by means of fluid chambers which zonewise carry different temperatures. In these prior rolls, where a semicircular pressure oil cushion is subdivided in several chambers, the deflection is influenced by variation of the oil pressure and the roll diameter is influenced zonewise by variation of the temperature of the pressure oil. In the prior roll, the width of the area which inwardly is pressurized with pressure oil equals approximately the width of the paper web to be treated. The above-mentioned drawbacks occur also with these rolls, since the ends of the rolls deform conically toward the end, in the area of the paper web edge. Depending on the temperature gradient between the paper web and the end sides of the rolls, thicker or thinner edges are thus created along the paper web. Furthermore, this prior roll possesses disadvantages insofar as it features transverse seals that slide on the inside of the roll shell for separation of the pressure chambers, as viewed across the width of the roll. Such transverse seals are known to cause localized temperature increases, due to friction on the roll shell, and thus undesirable, nonuniform diameter increases of the roll.

Aside from the roll known from the German patent document 31 28 722, press rolls of that type are known from "Das Papier," 1986, page 485-495, and "Das Papier," 1988, page 325-330.

The former paper ("Das Papier," 1986) presents a press roll where the ring-shaped intermediate space is partitioned by means of two longitudinal seals so as to obtain a semicircular pressure space for transferring the pres force from the roll shell to the flexural backing. The two longitudinal seals are arranged on the yoke and extend from the one transverse seal to the other transverse seal. According to the one embodiment, the transverse seals extend only approximately across one-half of the circumference of the flexural backing, so that only a single, semicircular pressure chamber exists (compare FIG. 8). According to a second embodiment, the transverse seals extend across the entire circumference of the flexural backing, thereby forming a semicircular high-pressure chamber and an opposite semicircular low-pressure chamber that acts in the opposite direction (compare FIG. 6).

The second paper ("Das Papier," 1988) describes a press roll where the transverse seals extend across the entire circumference of the bending entity and where no longitudinal seals exist. The pressure chamber is defined solely by the transverse seals and, thus, is ring-shaped. Hydrostatic backing elements are provided in the pressure chamber for transferring the press force from the roll shell to the flexural backing. What has been said for the German patent disclosure 31 28 722 is basically applicable to the press roll taught here. A sufficiently wide marginal area is missing between the inside of the press rolls and one edge of the paper web in both, and the same problems occur.

Based on the above prior art, the problem underlying the invention is to so advance and improve a press roll of the general type that thermally caused diameter differences between these marginal areas and the center area of the roll shell will be avoided.

SUMMARY OF THE INVENTION

This problem is solved in that on each roll end, and in the area of the marginal zone on the inside of the roll shell, a channel type cavity is provided which can be charged with the heat transfer medium.

Preferably, the edges of the roll shell are thermally influenced in that from the pressure space inside the roll shell a small amount of a heat transfer fluid, that is, of the pressure oil, is branched off and fed into the channel type cavities via channels, with the channel type cavities being defined directly by the roll shell. Each of the channel type cavities is preferably fashioned as at least one circular space. The amount of oil branched off into this circular space is controlled through choking points. After passing through the circular space, the oil drains unpressurized into the return chamber of the roll shell.

Thus, under certain operation conditions it is possible to avoid diameters that are too small, i.e., cold roll edges, and consequently excessively thick paper edges. This phenomenon is known specifically on so called two-roll calenders of high-speed paper machines. Thus, a small, additional and controllable influence can be exerted on the thickness of the paper edges by variation of the oil temperature in the press roll.

According to further invention, the influenceability of the thickness of the paper edges is still further improved by providing in the fixed axle of the press roll an additional fluid line through which a temperature control fluid which is thermally adjustable independently from the pressure oil can be fed into the channel type cavity. In this respect it is possible to feed temperature control oil to both ends of the roll, i.e., to the cavities of both roll ends, each by itself or through a joint fluid line. The connection between the fluid line and the cavity therefore is preferably such that the temperature control fluid is introduced in the pressure chamber in the area of the transverse seal and proceeds from there through channels in a revolving disk seal into the cavity.

On the basis of the above embodiment, the thickness of the paper edges can be "controlled" through changing the temperature of the temperature control fluid. This control specifically is suitable wherever the temperature of the pressure fluid in the pressure space sometimes needs to be increased and sometimes needs to be reduced for operational reasons.

In a case where (for instance the above two-roll calenders) the temperature gradient does not change, i.e., where during the operation of the system only a heating of the marginal areas of the roll shell is required, a temperature control fluid of constant temperature may be used as well. The control of the paper edge thickness then takes place through adjustment of the flow volume.

Naturally, it is also conceivable to effect the thermal influencing of the diameter of the marginal areas of the roll shell through a combination of temperature and volume control of the temperature control fluid.

By design, feeding the temperature control fluid from the fluid line in the fixed axle to the channel type cavity is solved in such a way that the temperature control fluid is passed through channel arrangements in the area of a transverse seal of the pressure space, and at that, without additional seal arrangement between the pressure space and the point of temperature control fluid introduction. The temperature control fluid is passed through a number of conduits in said rotating disk seal, through an annular channel type collecting groove and from there through dosing bores or further channels into a revolving, annular channel type distributing channel. From there, the temperature control fluid proceeds uniformly into the channel type cavity. Through an annular channel-type second collecting groove provided on the second end of the cavity, the temperature control fluid is finally passed through radial bores to the low-pressure area of the fluid return.

The temperature control of the separate temperature control fluid is preferably effected through a side line which branches off from the pressure line for the pressure chamber of the roll shell, which side line extends through a heat exchanger and is connected with the roll ends by way of regulating valves. Incorporated between said branch-off and the inlet on the pressure space is a pressure reduction valve in the pressure line, which ensures that the pressure of the temperature control fluid will be higher than the pressure of the pressure fluid. This concept makes it possible to avoid a separate pump for the temperature control fluid.

BRIEF DESCRIPTION OF THE DRAWINGS

The invention will be more fully explained hereafter with the aid of the drawings.

FIG. 4 shows an enlarged section from the longitudinal section according to FIG. 3;

FIG. 5 shows a partial section of the section relative to FIG. 4 along the sectional plane A—A of FIG. 4;

FIG. 6 shows a cross section of the longitudinal section relative to FIG. 3 along the sectional plane B—B of FIG. 3.

DESCRIPTION OF THE PREFERRED EMBODIMENT

Figure 1:
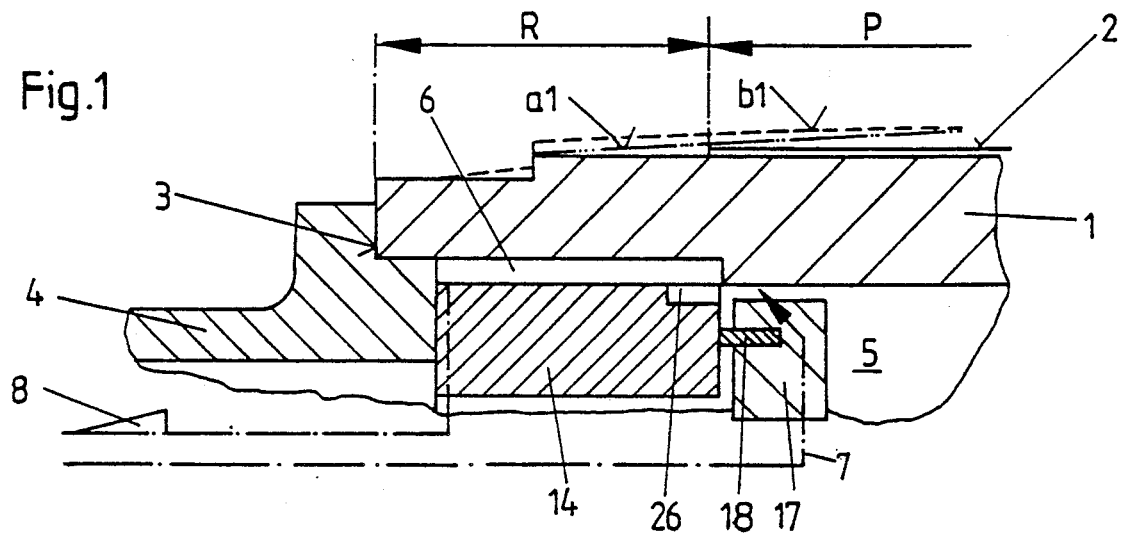
FIGS. 1 and 2 each show a partial longitudinal section of the marginal area of a press roll for illustration of the basic problem underlying the invention and of the basic solution of said problem.
Figure 2:
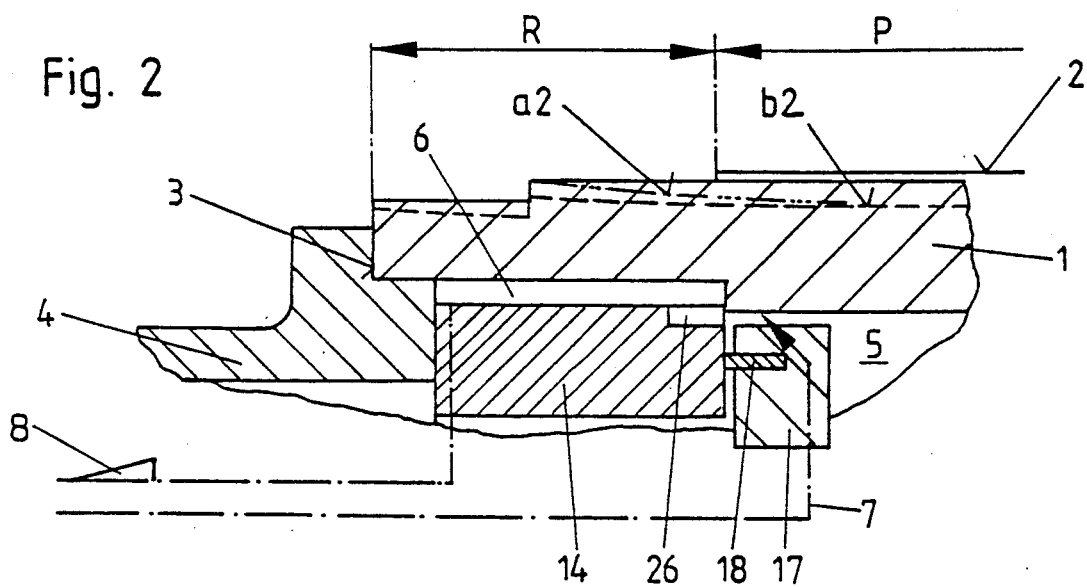

Illustrated in each of FIGS. 1 and 2 is a marginal area of a roll shell 1 representing a press roll (with hollow journal 4), across which passes (perpendicularly to the drawing plane) a paper web 2 of width P.

In the area of the paper web width P, the interior of the roll shell 1 is fashioned as a pressure space 5 whose internal pressure forces the roll shell 1, through sort of a pressure oil cushion, onto a backing roll (not illustrated). The said pressure space 5 is sealed toward the end side of the pressure roll and, moreover, is so fashioned by means of longitudinal seals that it will be effective only on the side facing the backing roll. Further design details are explained below in conjunction with FIGS. 3, 4, 5, and 6.

In FIG. 1 it is presumed, e.g., that the oil introduced in the pressure space 5 will not be heated. Solid lines serve to illustrate the silhouette of the roll shell 1 and portray the condition before a paper web 2 passes over the roll. During operation, when the temperature of the paper web 2 passing over the roll shell 1 is higher than the temperature of the roll shell 1, the latter will expand. This temperature difference has little effect on the profile of roll shell 1 in the area of the paper web width P but, as shown in FIG. 1, has a significant effect in the marginal zone R between the paper web 2 and the end side of the roll shell 1. This marginal zone R is not heated by the paper web 2, resulting in the marginal zone R undergoing a relative reduction in diameter toward the end side of the roll shell 1. Thus, the marginal zone R of the roll shell 1 becomes conic or crowned, which in FIG. 1 is illustrated by a dash-dot line (curve $a_1$) in exaggerated fashion In FIG. 2 it has been assumed, e.g., that the roll is being heated through temperature control of the pressure oil. Solid lines illustrate again the condition without a paper web 2. If the temperature of the paper web 2 passing over the roll shell 1 is lower than the temperature of the roll shell 1, a heat transfer will take place from the roll shell to the paper web 2. The diameter of the roll shell 1 is reduced, i.e., the roll shell 1 "shrinks." However, this "shrinking process" essentially takes place only in the area of the paper web width P. In the area of the roll shell end, the diameter remains essentially unchanged, resulting in a conic marginal zone which is inversely conic as compared to FIG. 1 (compare dash-dotted line $a_2$ in FIG. 2 to curve $a_1$ in FIG. 1).

The transition between the marginal zone R and the paper web 2 is not abrupt but rather is gradual; thus the marginal area of the paper web 2 also will be influenced. In the example according to FIG. 1, the paper web 2 becomes thicker at its edges than it is in the center; in the example according to FIG. 2 the paper web 2 becomes compressed at its edges, i.e., becomes thinner. Therefore, the paper quality is not optimal.

The core of the present invention, generally speaking, involves thermally influencing the roll shell 1 from inside in such a way that the shortcomings illustrated with the aid of FIG. 1 and FIG. 2, with regard to the outside contour of the roll shell 1, will be compensated for. The basic solution provides on the inside of the roll shell 1, in the area of the marginal zone R, a channel type cavity 6 which is supplied by a heat transfer medium whose temperature compensates for the temperature gradient between the paper web 2 and the roll shell 1.

This solution is schematically illustrated in FIGS. 1 and 2 and is based on the said cavity 6 featuring a feed line 7 and a pressureless drain line 8 for a heat transfer fluid. As constructed, the said channel type cavity 6 is formed by a spacer sleeve 14 which is inserted coaxially to the press roll and whose outside diameter is smaller than the inside diameter of the roll shell in this area. An annular gap (cavity 6) is thus created between the said spacer sleeve 14 and the roll shell 1.

Due to this configuration, the cavity 6 can be directly influenced thermally and the marginal zone R indirectly influenced in such a way that the relative end side diameter reduction (according to FIG. 1) or the relative end side diameter enlargement (according to FIG. 2) will be equalized.

Thus, the diameter of the roll shell 1 is specifically enlarged in the area of the marginal zone R, according to the dashed line $b_1$ in FIG. 1. The dashed line $b_2$ in FIG. 2 shows the specifically reduced diameter of the roll shell 1 in the area of the marginal zone R.

With proper infeed of the backing roll, a constant line force is thus possible across the entire width of the paper web 2, between the press roll and the backing roll.

Figure 3:
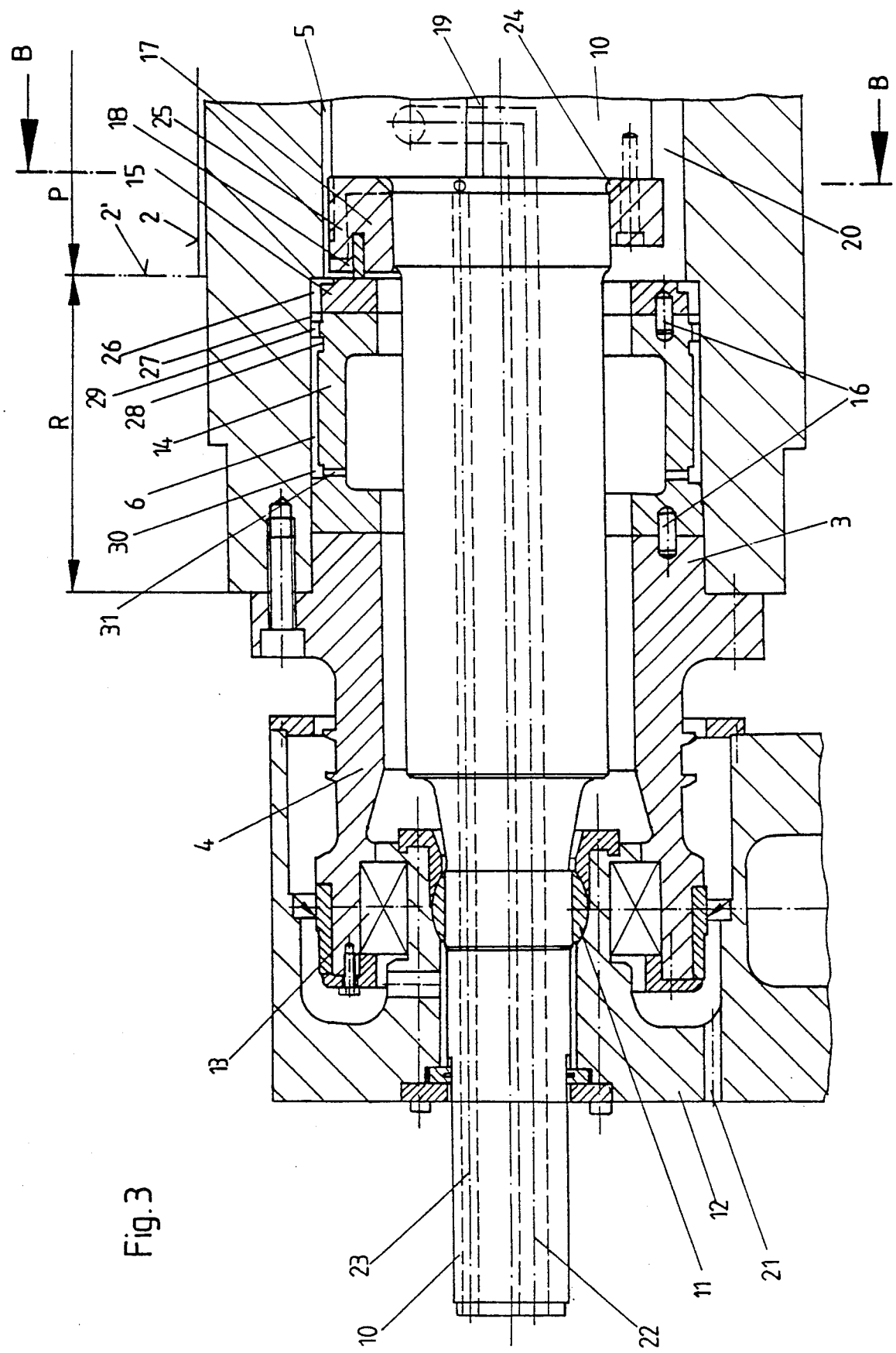
FIG. 3 shows a longitudinal section of the free end of a press roll with hydraulic backing of the roll shell.

FIG. 3 shows a longitudinal section of one end of a press roll with hydraulic backing of a roll shell 1. This illustration and the additional cross sectional illustrations derived from it, according to FIGS. 4–6, serve to explain the details of the invention on the basis of the cavity 6 for thermally influencing the marginal zone R between the edge of the paper web 2 and the end side of the roll shell 1.

FIG. 3 shows a fixed axle 10 which through the intermediary of ball bushings 11 bears in bearing housing 12. Retained inside these bearing housings 12 is a self-aligning roller bearing 13 whose outer race supports the rotating hollow journal 4 which is screwed on the roll shell 1. The hollow journal 4 bears with its inner shoulder 3 on a spacer sleeve 14 which, in turn, borders axially on a sealing disk 15. A relative rotation between the two is prevented by means of driver pins 16 between the hollow journal 4, the spacer sleeve 14 and the sealing disk 15.

In a holder ring 17 screwed on the axle 10 there are transverse seals provided in the upper half-space, i.e., on the side toward the backing roll (compare 40 in FIG. 6), which are fashioned as end seals that are movable in the axial direction. These end seals 18 and two bordering longitudinal seals 19 define the pressure space 5.

An oil return chamber 20 extends through the entire roll shell 1 and through the hollow journal 4 up into the bearing housing 12. Contained in one of the two bearing housings 12 are return bores 21 for draining the pressure oil pumped through the press roll.

The pressure oil for generating a pressure in the pressure chamber 5 is introduced through an axially parallel bore 22 in the journal of the axle 10. Through another axially parallel journal bore 23, temperature control fluid, specifically temperature control oil can be introduced in an annular groove 24 and thence through channels 25 into the vicinity of the end seal 18. Due to the high pressure, the temperature control oil flows into the end areas of the pressure chamber 5 and displaces (as will yet be explained hereafter) more or less the pressure oil contained there. On the circumference of the sealing disk 15 there are several conduits 26 provided which empty into the annular channel 27.

The oil flow volume is limited at operating pressure by restricting channels 29 provided between the annular channel 27 and another channel 28. The oil proceeds from the additional annular channel 28 into an annular gap that forms the channel type cavity 6 and into another annular channel 30 that borders on it and communicates by way of radial bores 31 with the oil return chamber 20. Radial bores 31 also may be configured to serve as chokes instead of said restricting channels 29.

As long as the journal bore 23 is not pressurized with temperature control oil, part of the regular pressure oil flows intermittently from the pressure space 5 into the conduits 26 of the sealing disk 15 that rotate past the pressure space 5, and proceeds through the channel type cavity 6 and the radial bores 31 finally into the oil return chamber 20. In keeping with the general basic idea of the present invention, the effect of this measure may already be sufficient. Naturally, the journal bore 23 would in this case be dispensable.

When the journal bore 23, if available, is supplied with a steadily increasing amount of temperature control oil at a temperature varying from that of the pressure oil, the temperature control oil will mix with the escaping pressure oil, changing the temperature of the latter increasingly until the influx of temperature control oil through the channel type cavity 6 corresponds to the outflow. At a given temperature of the temperature control oil, a maximum edge correction is thereby achieved.

When increasing the amount of temperature control oil further, part of the temperature control oil will flow toward the center of the web width P roll, widening the marginal area that is influenced. This may be desirable under certain operating conditions.

The invention thus achieves:
(a) a very simple temperature control of the marginal zone R within broad limits without additional seals;
(b) when needed, a specific widening of the temperature-controlled marginal zone R.

The overall configuration is such that the paper edge 2' will at least approximately be in the vicinity of the end seal 18 and the sealing disk 15. At this juncture it is pointed out once more that the length of the roll shell 1 by the marginal zones R on both ends is greater than the width P of the paper web 2.

When introducing a temperature control oil with a temperature exceeding that of the pressure oil, the press roll becomes bigger in the area of the paper web edge 2, (see FIG. 1, curve $b_1$). Contrarily, when introducing relatively cool temperature control oil, the press roll contracts at the paper web edge 2' (see FIG. 2, curve $b_2$).

FIG. 4 shows an enlarged section of the longitudinal section according to FIG. 3, for further clarification of the design in the area of the annular gap forming the channel type cavity 6 according to FIGS. 1 and 2.

The channel type cavity 6 is formed by the spacer sleeve 14 that bears on the circular sealing disk 15 and is connected therewith by a drive pin. The sealing disk 15, in turn, bears on a revolving shoulder on the inside of the roll shell 1, and the spacer sleeve 14 is fixed on its other end by the hollow journal 4.

According to the illustration in FIG. 4, the connection between the pressure chamber 5 and the channel type cavity 6 consists of the conduits 26 that are provided on the circumference of the sealing disk 15 and which empty into the annular channel 27. The temperature control fluid then flows via the restricting channels 29 into another annular channel 28, and from there (well distributed and well mixed) into the channel type cavity 6. The latter extends on its other end into another annular channel 30, from which the temperature control fluid drains through a number of radial bores 31 to the oil return chamber 20. (The flow path and flow direction of the temperature control fluid are indicated by arrow direction).

FIG. 5 shows the sealing disk 15 as seen from the pressure chamber 5. Provided in the sealing disk 15 are several conduits 26 that are distributed on the circumference and behind which there are located the annular channels 27, 28, 30 (defined inwardly by an invisible edge c) and the channel type cavity 6. These annular channels and the channel type cavity each are defined by the inside wall 1' of the roll shell 1.

Also visible is the restricting channel 29, which alternatively may be fashioned as a bore or aperture. Also illustrated are two of the radial bores 31 that are provided in the spacer sleeve 14.

FIG. 6 shows a cross sectional illustration of a roll shell 1 along the sectional plane B—B according to FIG. 3. From this illustration it can be seen specifically that the press roll formed by the roll shell 1 bears on the backing roll 40 and that the paper web 2 passes between these two rolls.

The roll shell 1 is drawn as a circular surface. Located between the retaining ring 17 mounted on the axle 10 and the roll shell 1 is an annular gap which has open connection with the pressure chamber 5 inside the roll shell 1. Visible again are the two diametrically arranged longitudinal seals 19 and the polygonally arranged end seal 18, which together define the pressure chamber 5.

The axle 10 features the axially parallel bore 22 for the pressure oil and, as the case may be, the further axially parallel journal bore 23 for the temperature control oil. The latter flows through the side channel 23' into the annular groove 24 and from there, by way of the channels 25, to the said annular gap that pertains to the pressure space 5.

Figure 7:
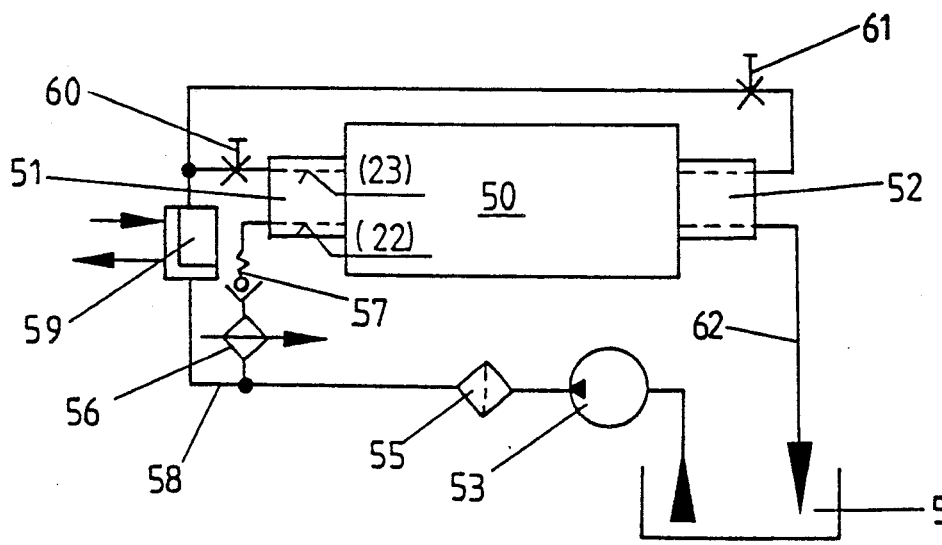
FIG. 7 shows a simplified basic diagram showing the hydraulic lines and their connections with the press roll according to FIG. 3, for the pressure fluid and the temperature control fluid.

FIG. 7 shows the hydraulic basic diagram for a simplified embodiment of the pressure oil and temperature oil supply and drain. The press roll is illustrated symbolically as a rectangle bearing the reference mark 50. The pressure oil and the temperature control oil are supplied and drained via the two end sections 51 and 52. A pump 53 sucks oil from an oil container 54 and forces it via a filter 55, a cooler 56 and a pressure reducer 57 into the one end section 51 (with bore 22) of the press roll 50. A line 58 branches off before the cooler 56, through which temperature control oil proceeds by way of a heat exchanger 59 to regulating valves 60 and 61. The one regulating valve 60 introduces the temperature control oil in the one end section 51 (with the journal bore 23 of the axle 10; compare FIG. 3). From the other regulating valve 61, the temperature control oil proceeds to the other end section 52.

In the heat exchanger 59, the temperature control oil can either be cooled (through a relatively cold heat exchanger medium) or heated (through a relatively hot heat exchanger medium), which symbolically is illustrated by the arrows on the heat exchanger. The outlet of the pressure reducer 57 is coupled with the bore 22 in the axle 10 and introduces the pressure oil there; from the second end section 52, a return line 62 extends back to the oil tank 54.

If necessary, the elements for control of the temperature and/or flow volume of the temperature control oil (heat exchanger 59 and/or regulating valves 60, 61) can be connected to a process control system which automatically renders the thickness cross profile of the paper web more uniform.

In conclusion, the following should be noted. The channel type cavity 6 for thermal charging of the marginal zone R has been described and pictorially illustrated as an annular gap. It goes without saying that instead of a single annular gap also several annular gaps may be provided that are connected with each other through annular channels. The marginal zone R itself has generally a width corresponding to about two to five times the thickness of the roll shell, which is about equal to 80 to 300 mm. The gap width of the channel type cavity is preferably chosen to be about 0.5 to 2 mm.

What is claimed is:

1. A press roll with controllable deflection for treatment of a web having a width, said press roll comprising:
   a rotatable roll shell having roll ends and an inside surface;
   a fixed axle extending axially through said roll shell, said roll shell and said fixed axle defining therebetween an annular intermediate space;
   means for generating a backing force between the rotatable roll shell and the fixed axle, said means comprising a pair of longitudinal seals and a pair of transverse seals each associated with a respective roll and of said roll shell and disposed within the annular intermediate space, said transverse seals extending circumferentially across at least part of said axle, said longitudinal seals and said transverse seals defining a pressure chamber therebetween having a length approximately corresponding to the width of said web, said pressure chamber being charged with a pressure fluid, each of said transverse seals being spaced from the respective roll end; and
   a pair of spacer sleeves each arranged inside said roll shell between one of said transverse seals and the respective roll end, in such a way that the respective roll end, the inside surface of the roll and the spacer sleeve define a channel type cavity being positioned outside the width of the web, said channel type cavity being connected via a first conduit to the pressure chamber and via a second conduit to a low pressure area, at least one of said conduits having a flow restriction point, the arrangement being such that a heat transfer fluid flows from the pressure chamber via said first conduit to said channel type cavity and from there via said second conduit to said low pressure area.

2. A press roll according to claim 1, in which said channel type cavity is formed as an annular space.

3. A press roll according to claim 1, in which said channel type cavity is formed as several successively flooded annular spaced.

4. A press roll according to claim 1, in which the channel type cavity communicates through a channel with the pressure chamber and with a low-pressure area such that the heat transfer fluid for the channel type cavity branches off from a pressure fluid in the pressure chamber.

5. A press roll according to claim 4, and further including means for rendering the heat transfer fluid more uniform at transition between the pressure chamber and the channel type cavity, said means including conduits which are distributed circumferentially.

6. A press roll according to claim 5, in which an annular channel is provided between the conduits and the channel type cavity, the annular channel having an inside diameter smaller than that of the channel type cavity.

7. A press roll according to claim 4, in which at least one flow restriction point is provided at a transition from the pressure chamber to the channel type cavity.

8. A press roll according to claim 5, in which at least one flow restriction point is provided at a transition from the pressure chamber to the channel type cavity.

9. A press roll according to claim 6, in which at least one flow restriction point is provided at a transition from the pressure chamber to the channel type cavity.

10. A press roll according to claim 4, in which at least one flow restriction point is provided at a transition from the channel type cavity to the low-pressure area.

11. A press roll according to claim 5, in which at least one flow restriction point is provided at a transition from the channel type cavity to the low-pressure area.

12. A press roll according to claim 6, in which at least one flow restriction point is provided at a transition from the channel type cavity to the low-pressure area.

13. A press roll according to claim 7, in which at least one flow restriction point is provided at a transition from the channel type cavity to the low-pressure area.

14. A press roll according to claim 1, and further including a pressure fluid for the pressure chamber, the pressure fluid having a temperature which is adjustable.

15. A press roll according to claim 1, in which a fluid line for separately supplying a temperature control fluid is provided through the axle and empties in a transition area between the pressure chamber and the channel type cavity.

16. A press roll according to claim 15, in which the fluid line is formed by an axially parallel journal bore, at least one side channel that extends sideways, an annular groove and at least one channel that is open toward the pressure chamber.

17. A press roll according to claim 16, and further including means for rendering the heat transfer fluid more uniform at transition between the pressure chamber and the channel type cavity, said means including conduits which are distributed circumferentially.

18. A press roll according to claim 17, in which at least one annular channel is provided between the conduits and the channel type cavity, the annular channel having an inside diameter smaller than that of the channel type cavity.

19. A press roll according to claim 18, in which the channel type cavity has a gap width of about 0.5 mm to about 2 mm.

20. A press roll according to claim 15, in which the temperature of the temperature control fluid is adjustable independently of that of the pressure fluid.

21. A press roll according to claim 15, in which the pressure of the temperature control fluid is adjustable independently of that of the pressure fluid.

22. A press roll according to claim 1, in which the roll shell has a thickness, and the marginal zone has a length equal to about twice to about five times the thickness of the roll shell.

* * * * *